Aug. 27, 1963 G. E. WARNAKA 3,101,744
WAVE GUIDE DAMPED AGAINST MECHANICAL VIBRATION BY
EXTERIOR VISCOELASTIC AND RIGID LAMINATION
Filed Feb. 26, 1962

INVENTOR.
Glenn E. Warnaka
BY
Ralph Hammar
Attorney

United States Patent Office 3,101,744
Patented Aug. 27, 1963

3,101,744
WAVE GUIDE DAMPED AGAINST MECHANICAL VIBRATION BY EXTERIOR VISCOELASTIC AND RIGID LAMINATION
Glenn E. Warnaka, Erie, Pa., assignor to Lord Manufacturing Company, Erie, Pa., a corporation of Pennsylvania
Filed Feb. 26, 1962, Ser. No. 175,435
2 Claims. (Cl. 138—139)

This invention is a metal wave guide which is protected from resonant vibration by staggered plates bonded to the outer surface of the wave guide by a viscoelastic layer. The staggered plates constrain the viscoelastic layer, causing a shear stress under bending, introducing damping which prevents injury without materially decreasing the required flexibility and without affecting the electrical properties.

Figure 1:
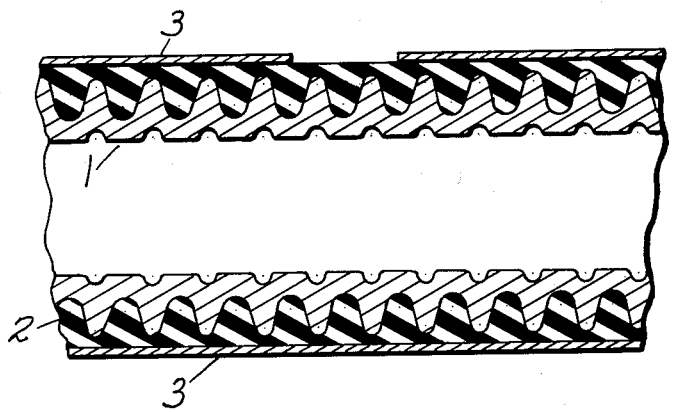
Figure 2:
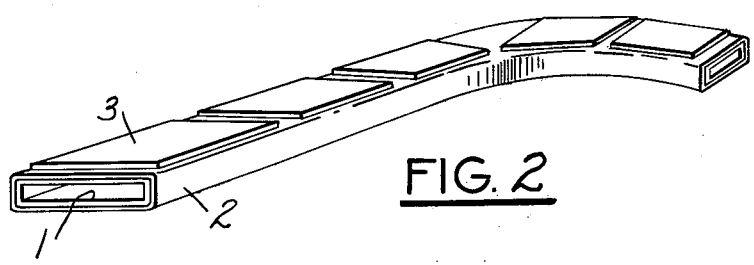
Figure 3:
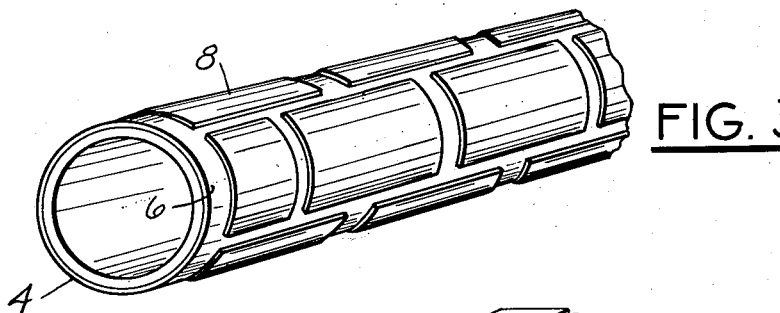
Figure 4:
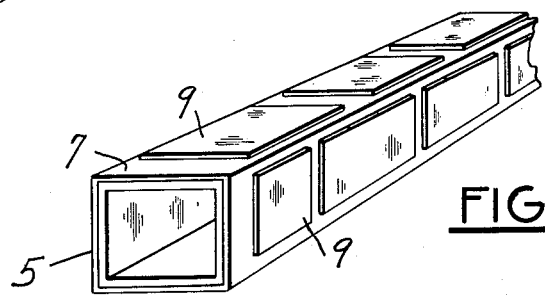

In the drawing, FIG. 1 is a longitudinal section through a wave guide, FIG. 2 is a perspective of the wave guide, and FIGS. 3 and 4 are perspectives of modifications.

The invention is shown applied to a wave guide 1 of generally rectangular section. Such wave guides are commonly made of beryllium-copper and are used to connect components of high frequency electronic equipment. The wave guides must be flexible to accommodate misalignment and relative motion between the connected parts. The wave guide is subject to rapid failure when exposed to resonant vibration.

Damage to the wave guide is prevented by bonding a layer 2 of viscoelastic material to the outer surface of the wave guide and by bonding to the upper and lower surfaces of the viscoelastic layer staggered, thin plates 3. The plates are relatively long compared to the spacing between adjacent plates but are materially shorter than an arc through which the wave guide may be bent so as not to interfere with the bending of the wave guide to line up with the connected equipment. By way of example, the plates 3 might be of stainless steel 5 mils thick with a length of 1¾ inches and a spacing between adjacent plates of ¼ inch. The plates might also be of structural plastic or glass and plastic laminates or other rigid material having a high modulus of elasticity compared to the modulus of the viscoelastic layer. Under any bending mode of the wave guide, the viscoelastic layer 2 is subjected to shear. The outer surface of the viscoelastic layer is constrained by the plates 3 while the inner surface of the viscoelastic layer is constrained by the outer surface of the wave guide. No matter how the wave guide is bent, there is a shearing action which introduces damping due to the high internal friction of the viscoelastic layer and the low modulus of elasticity as compared to the modulus of elasticity of the wave guide 1 and plates 3. The viscoelastic layer 2 and plates 3 slightly increase the stiffness of the wave guide but the primary effect is a marked reduction in the mechanical Q which greatly reduces the possibility of damage under resonant vibration.

In FIGS. 1 and 2, where the wave guide is of rectangular cross section, the damping need be applied only to the upper and lower or major faces of the wave guide. In FIGS. 3 and 4 where the tubes 4 and 5 are respectively of circular and square section, the viscoelastic layer 6 and 7 is applied over the outer surface and plates 8 and 9 are similarly applied over the outer surface with adjacent plates being in staggered relation to each other. For the circular shape of FIG. 3, the individual plates 8 would be of arcuate section while for the square shape of FIG. 4, the plates 9 would be flat. In each case, the viscoelastic layer is bonded to the outer surface of the tube and the staggered plates are bonded to the outer surface of the viscoelastic layer in the same manner as in FIGS. 1 and 2.

What is claimed as new is:

1. A wave guide for conducting radio frequency power comprising a hollow corrugated metal tube, a layer of viscoelastic material having high internal friction and low modulus of elasticity compared to the metal and bonded to the outer surface of the tube, and plates having a high modulus of elasticity compared to the viscoelastic layer and bonded to the outer surface of the viscoelastic layer, said plates being arranged in at least two rows with the plates in each row spaced along the length of the tube and laterally spaced from the plates of an adjacent row and with the plates in one row overlapping the joints between plates of an adjacent row.

2. A hollow metal tube, a layer of viscoelastic material having high internal friction and low modulus of elasticity compared to the tube bonded to the outer surface of the tube, and spaced metal plates having a high modulus of elasticity compared to the viscoelastic layer and bonded to the outer surface of the viscoelastic layer, said plates being arranged in at least two rows with the plates in each row spaced along the length of the tube and laterally spaced from the plates of an adjacent row and with the plates in one row overlapping the joints between plates of an adjacent row.

References Cited in the file of this patent

UNITED STATES PATENTS 2,994,050    Ayer _____ July 25, 1961

FOREIGN PATENTS 877,692    France _____ Sept. 14, 1942